(12) United States Patent
Shuf et al.

(10) Patent No.: US 9,235,622 B2
(45) Date of Patent: Jan. 12, 2016

(54) SYSTEM AND METHOD FOR AN EFFICIENT QUERY SORT OF A DATA STREAM WITH DUPLICATE KEY VALUES

(75) Inventors: Yefim Shuf, Millwood, NY (US); Hong Min, Poughkeepsie, NY (US); Hubertus Franke, Cortlandt Manor, NY (US); Allan B. Lebovitz, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 12/394,572

(22) Filed: Feb. 27, 2009

(65) Prior Publication Data

US 2010/0223269 A1 Sep. 2, 2010

(51) Int. Cl.
*G06F 17/30* (2006.01)

(52) U.S. Cl.
CPC ................................. *G06F 17/30486* (2013.01)

(58) Field of Classification Search
CPC ..................... G06F 17/30483; G06F 17/30486
USPC ................... 707/752, 753, 692, 715
See application file for complete search history.

(56) References Cited

U.S. PATENT DOCUMENTS

| 5,802,521 | A | * | 9/1998 | Ziauddin et al. | 1/1 |
| 5,903,887 | A | * | 5/1999 | Kleewein et al. | 1/1 |
| 5,978,792 | A | * | 11/1999 | Bhargava et al. | 707/692 |
| 6,029,163 | A | * | 2/2000 | Ziauddin | 1/1 |
| 6,282,541 | B1 | | 8/2001 | Hoa et al. | |
| 6,430,550 | B1 | | 8/2002 | Leo et al. | |
| 6,519,593 | B1 | | 2/2003 | Matias et al. | |
| 6,601,061 | B1 | * | 7/2003 | Holt et al. | 1/1 |
| 6,629,094 | B1 | * | 9/2003 | Colby et al. | 707/713 |
| 6,801,903 | B2 | * | 10/2004 | Brown et al. | 1/1 |
| 7,089,382 | B2 | * | 8/2006 | Direen | 711/161 |
| 7,167,852 | B1 | * | 1/2007 | Ahmed et al. | 707/714 |
| 7,775,682 | B2 | * | 8/2010 | Zhou | 362/249.06 |
| 2004/0059743 | A1 | * | 3/2004 | Burger | 707/101 |
| 2005/0055334 | A1 | * | 3/2005 | Krishnamurthy | 707/2 |
| 2007/0005556 | A1 | * | 1/2007 | Ganti et al. | 707/1 |
| 2007/0071240 | A1 | * | 3/2007 | Shipley et al. | 380/255 |
| 2009/0313115 | A1 | * | 12/2009 | Konig et al. | 705/14.45 |

OTHER PUBLICATIONS

Robert E. Tarjan, Algorithm design, Communications of the ACM, v.30 n. 3, p. 204-212, Mar. 1987.*
Various authors, "Fast sort algorithms for arrays with mostly duplicated elements?", stackoverflow.com, Nov. 18, 2011.*
"Framework and Alogrithms for Trend Analysis in Massive Temporal Data Sets"; Sreenivas Gollapudi et al., CIKM'04 Nov. 8-13, 2004, Washington, DC, pp. 168-177.

(Continued)

*Primary Examiner* — Grace Park
(74) *Attorney, Agent, or Firm* — Cantor Colburn LLP

(57) ABSTRACT

An apparatus and method for efficiently performing a query sort on a data set with duplicate key values is disclosed. The method includes identifying unique key values for a key in a data set after determining that a number of duplicate key values for the key exceed a predefined threshold. The method also includes recording an association of each unique key value with a record in the data set and sorting unique key values. The method further includes storing the unique key values in a sorted order, wherein each unique key value is associated with an appropriate record in the data set.

1 Claim, 4 Drawing Sheets

(56) References Cited

OTHER PUBLICATIONS

"The Sort-Merge-Shrink Join"; Christopher Jermaine et al., ACM Transactions on Database Systems, vol. 31, No. 4, Dec. 2006, pp. 1382-1416.

"Implementing Sorting in Database Systems"; Goetz Graefe, ACM Computing Surveys, vol. 38, No. 3, Article 10, Publication date: Sep. 2006, pp. 1-37.

* cited by examiner

SYSTEM AND METHOD FOR AN EFFICIENT QUERY SORT OF A DATA STREAM WITH DUPLICATE KEY VALUES

BACKGROUND OF THE INVENTION

1. Field of the Invention

This invention relates to the field of database sorting and particularly to an apparatus and method for efficiently performing a query sort on a data set with duplicate key values.

2. Description of the Related Art

A database management system (DBMS) is a program that enables multiple computer users to access and create data in a database. The DBMS manages database requests and ensures the integrity and security of the data. The most typical DBMS is a relational database management system (RDBMS) that enables the creation and maintenance of a relational database. A relational database includes a collection of data items organized as a set of formally-described tables from which data can be accessed or reassembled in many different ways without having to reorganize the database tables. Another kind of DBMS is the object-oriented database management system (ODBMS) that supports the modeling and creation of data as objects. It should be noted that the present invention is not limited to a specific type of DBMS.

Sorting is a frequent and resource-intensive operation performed by the DBMS. The DBMS may employ a general purpose sorting algorithm that is good at sorting a wide variety of data efficiently. However, a general purpose sorting algorithm may not be as efficient in certain special, but commonly occurring scenarios. One such scenario involves sorting a data set where many of the key values include duplicates. While the DBMS normally maintains statistics to recognize that the values of a particular key are not unique and include duplicates, the general purpose sorting algorithm typically does not leverage this information. As a result, during sorting operations the general purpose sorting algorithm typically sorts all of the duplicate values in the key. For a data set with N elements, a good sorting algorithm with an order N*Log N time complexity, will perform O(N*Log N) operations.

Consequently, these general purpose sorting algorithms spend needless CPU processing time sorting duplicate key values. These duplicate values also occupy significant memory space during the sorting operation. For a long key, storing duplicate values during the sorting operation may exhaust the available space in the main memory. So, for example, if an intermediate result of a sorting operation cannot fit in the main memory, one or more partial results of the sort operation will have to be written to an external device, and then read back for merging. This causes unnecessary input/output (I/O) activities and delays.

There is a need to reduce the amount of system resources utilized during sorting operations. Hence, there is a need to produce a sorting algorithm that efficiently uses CPU and memory resources, thereby reducing I/O activities and delays.

SUMMARY OF INVENTION

The present invention may be directed to an apparatus and method for efficiently performing a query sort on a data set with duplicate key values. The method may include identifying unique key values for a key in a data set after determining that a number of duplicate key values for the key exceed a predefined threshold. The method may also include recording an association of each unique key value with a record in the data set and sorting unique key values. The method may further include storing the unique key values in a sorted order, wherein each unique key value is associated with an appropriate record in the data set.

Another embodiment of the invention may be directed to an apparatus including an identifying unit for identifying unique key values for a key in a data set after determining that a number of duplicate key values for the key exceed a predefined threshold. The apparatus may also include a recording unit for recording an association of each unique key value with a record in the data set and a sorting unit for sorting unique key values. The apparatus may further include a storing unit for storing the unique key values in a sorted order, wherein each unique key value is associated with an appropriate record in the data set.

Another embodiment of the invention may be directed to a computer program embodied on a computer readable medium, the computer program comprises program code for controlling a processor to execute a method comprising identifying unique key values for a key in a data set after determining that a number of duplicate key values for the key exceed a predefined threshold. The method may also include recording an association of each unique key value with a record in the data set and sorting unique key values. The method may further include storing the unique key values in a sorted order, wherein each unique key value is associated with an appropriate record in the data set Another embodiment of the invention is directed to a method comprising identifying unique key values for a key in a data set after determining that a number of duplicate key values for the key exceed a predefined threshold. The method may also include sorting unique key values and storing the unique key values in a sorted order, wherein each unique key value is stored a number of times the unique key value is associated with a record in the data set.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF EMBODIMENTS OF THE INVENTION

Embodiments in which the present invention may be applied to an apparatus and method for efficiently performing a query sort of a data set with duplicate key values is described in detail below with reference to the accompanying drawings.

Figure 1:
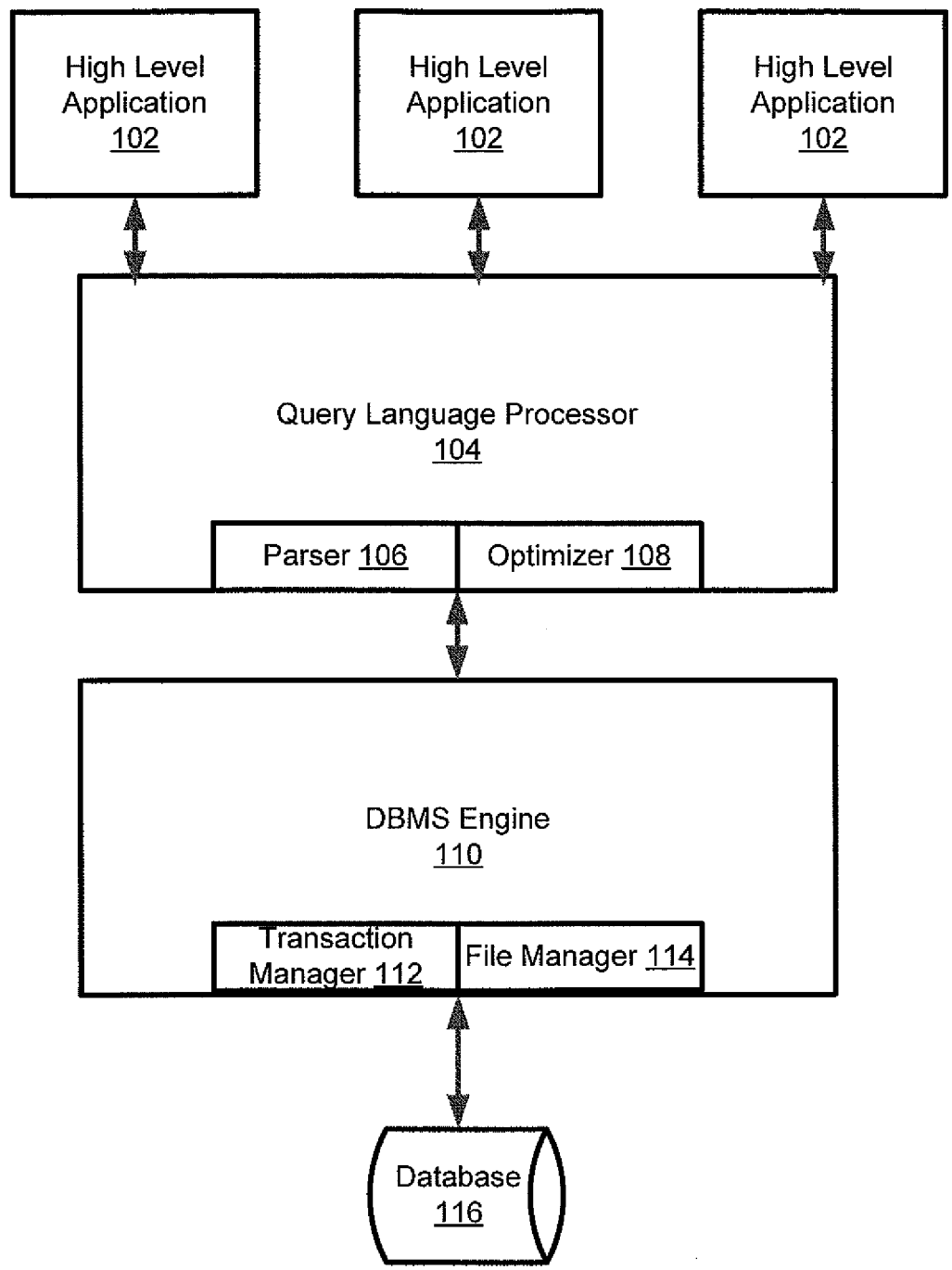
FIG. 1 illustrates an embodiment of a physical architecture of a DBMS.

Database Management Systems (DBMS) are very complex, sophisticated software applications that provide reliable management of large amounts of data. It is typically implemented as a back-end server in a computer network. FIG. 1 illustrates an embodiment of a DBMS that describes the software components used to enter and process data, and how these software components are related and interconnected. Although it is not possible to generalize the component structure of the DBMS, FIG. 1 identifies a number of key functions which may be common to most database management systems. A number of high level applications 102 may run on top of the DBMS. These may be applications provided by a DBMS vendor or a third party. Users interact with applications 102 which query the DBMS for information. A query language processor 104 may be responsible for receiving query language statements from high level applications 102 and for converting the query statements to a form that a DBMS engine can understand. Query language processor 104 usually includes a parser 106 which receives query language statements from application programs 102 or command-line utilities and examines the syntax of the statements to ensure they are correct. Query language processor 104 also typically includes a query optimizer 108 which may examine the query language statement and select the most efficient method of executing the query.

A DBMS engine 110 is responsible for all of the data management in the DBMS and usually includes a transaction manager 112 and a file manager 114. Transaction manager 112 maintains tables of authorization and currency control information. DBMS engine 110 may use the authorization tables to allow the transaction manager 112 to ensure the user has permission to execute the query language statement on a database. File manager 114 is the component responsible for all physical input/output operations on a database 116. File manager 114 is concerned with the physical address of the data on the disk, and is responsible for any interaction (reads or writes) with the host operating system.

Whether the DBMS offers relational, object-relational, or other data structures at the user interface, internally they have to be mapped into fixed-length blocks that serve as the basic I/O-unit of transfer between a main memory and a secondary memory. The DBMS typically provides a number of indexing techniques, such as tree-structured or hash-based methods, which allow for fast content-based searching of records. Often, the suite of such indexing techniques can be extended to match the requirements of particular applications.

Sorting is a frequent and resource intensive operation requested by many high level applications 102. In order to be practically useful in a commercial database product, a sorting algorithm must be reasonably simple to maintain, effective and robust for a wide range of workloads and operating conditions. One such operating condition involves a commercial database wherein a key includes duplicate values. In order to reduce the CPU usage, memory usage and I/O operations associated with sorting all of the duplicate values in a data set, an embodiment of the present invention provides a sorting algorithm for sorting a data set with duplicate key values.

In an embodiment of the invention, prior to performing a query sort of a data set, a determination is made as to whether the data set includes duplicate key values that exceed a predefined threshold. If the data set does include duplicate key values exceeding the predefined threshold, the distinct keys values in the data set are identified. The association of each key value with a data element/record is recorded. Specifically, data elements with the same key values may be grouped together and each unique key value may be emitted to a memory device. The emitted key values are sorted. Thus, only the unique key values are emitted to memory and sorted. The sorted keys are emitted to the database and each key value may be re-associated with the appropriate data element/record. Thus, each unique key value is stored in a sorted order, wherein each unique key value is stored a number of times the unique key value is associated with a record in the data set.

To determine whether the data set includes duplicate key values that exceed a predefined threshold, any number of preexisting methods may be used. In one example, database statistics collected for columns in the data set associated with key values may be used to determine if the data set includes duplicate key values that exceed the predefined threshold. In another example, a subset of the key values may be sampled to determine whether the data set includes duplicate key values that exceed a predefined threshold. It should be noted that the determination that the sequence of data to be sorted has duplicate key values can be performed outside of a sort module. This determination may even be performed by an external utility.

Once the determination is made that the data set includes duplicate key values that exceed a predefined threshold, the unique key values are identified. A hashing data structure may be used to identify each unique key value. For example, the key may be transformed using a hash function into a hash, a number that is used as an index in an array to locate the desired location where the unique key value should be stored. The optimal hash function for use in a hash data structure can vary widely, depending on the nature of the key. Other known methods may be used to identify each unique key value in the data set.

In an embodiment of the present invention, the association of each unique key value with a record in the data set is recorded. Thereafter, each identified unique key value, is added to a sorting data structure, for example a self adjusting tree. The self adjusting tree structure stores elements in a sorted order while preserving efficient insert time (Log x) for each element. Once all unique keys values are added to the sorting data structures, the unique key values are already sorted by the sorting data structure and can be emitted/blended with the other data elements in the data set. Thus, in an embodiment of the invention, there is no separate sort step. So the identification of unique key values and the sorting of the unique key values may proceed concurrently.

Thereafter, the sorted key values may be emitted in the order of the keys values and re-associated with the appropriate records in the data set. Each key value is stored in the data set the number of times the key value appeared in the original data set. For a data set that is a sequence of key and value pairs, i.e. (KEY_i, VALUE_i) for i=1 . . . N, where N is the number of elements/records in the data set out of which there are only U unique key values, where U<<N, i.e., U is less than N, The amount of work performed for sorting is now:

O(1) to use statistical information to determine if the number of duplicate key values exceeds the predefined threshold;

O(U) to identify distinct key values;

O(N) to record how each key value is associated with its data element;

O(U*Log U) to sort the unique key values; and

O(N) to emit each unique key value and recreate the association of each key value with the appropriate record in the data set.

Hence for U<<N, the amount of work performed by an algorithm implementing an embodiment of the invention effectively becomes O(N), which is an improvement the over O(N*Log N) operation performed by general purpose sorting algorithms. An embodiment of the present invention may therefore be used in the DBMS to reduce the amount of CPU processing time and memory required during sorting. Furthermore, I/O activity and I/O wait time may be eliminated by reducing a chance that an intermediate result of the sorting operation cannot fit in the main memory.

In an embodiment of the invention, when a data set includes only duplicate keys and the number of duplicate key values exceeds a certain threshold, each unique key value is identified. For each unique key value, a count is recorded of the number of times the key value is identified in the original data set. The unique keys values are added to a sorting data structure, for example a self adjusting tree. The amount of work performed for this sorting operation is O(U*Log U). The sorted key values are emitted in the order of keys by repeating each key value the number of times they appeared in the original data set.

Figure 2:
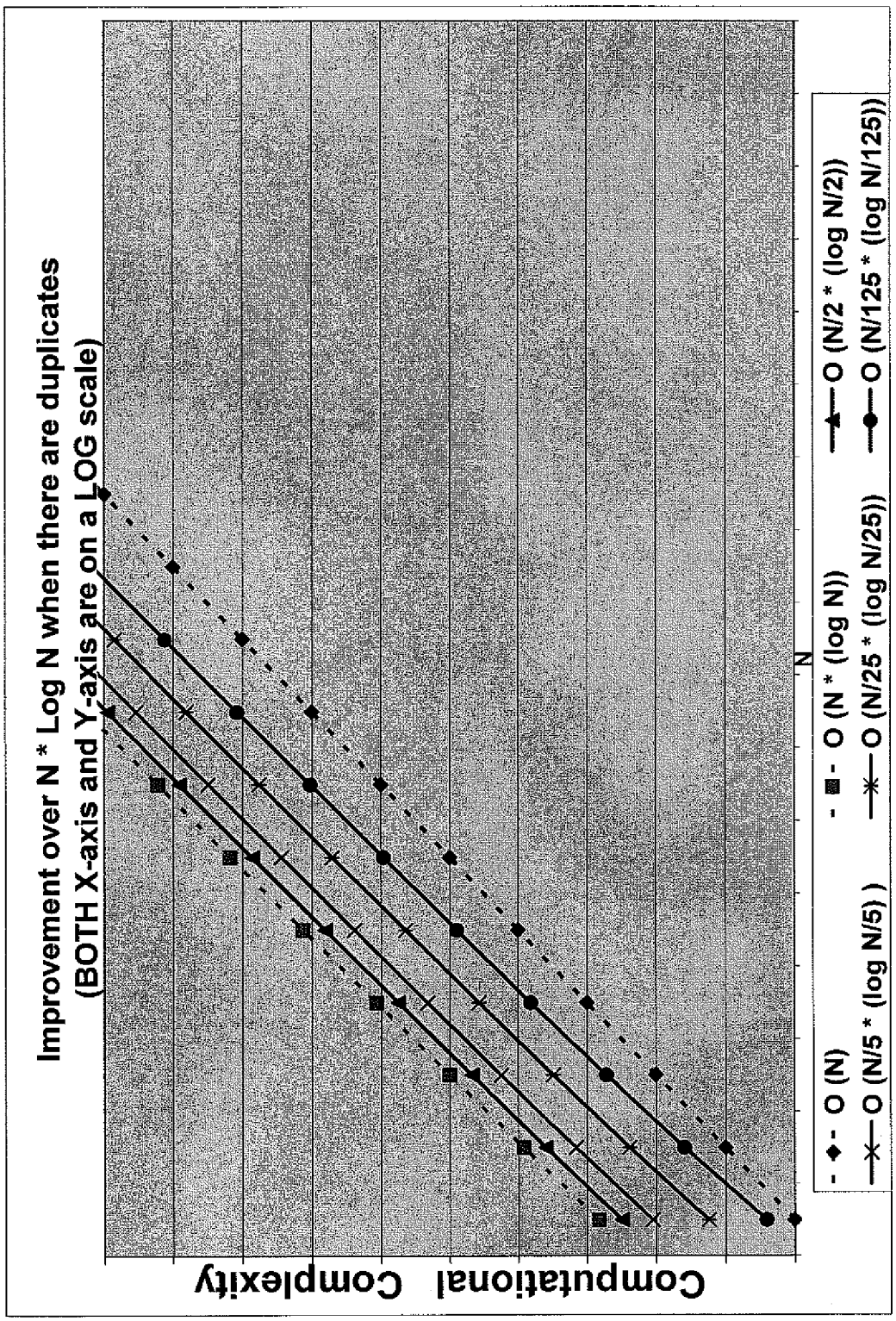
FIG. 2 illustrates an embodiment of the present invention which provides an improvement over N*Log N operations when there are duplicate key values in a data set.

FIG. 2 illustrates and embodiment of the present invention which provides an improvement over N*Log N when there are duplicate key values in the data set. It can be seen that the greater the number of duplicates and the smaller the number of the unique key values that need to be sorted. Thus, embodiments of the present invention are more likely to perform better than O(N*log N) algorithm and will approach the performance of a O(N) algorithm. For example, a curve labeled by O(N/5*Log(N/5)) represents a case where ⅕ of all key elements are unique. It can be seen its computational complexity improves over O (N*Log N). Further, a curve labeled by O(N/125*Log(N/125)) represents a case where ¹⁄₁₂₅ of all key elements are unique. It can be seen its computational complexity improves even more over O (N*Log N) and is approaching computational complexity of O(N). Those skilled in the art would recognize that there is an implied constant factor when discussing computational complexity.

Figure 3:
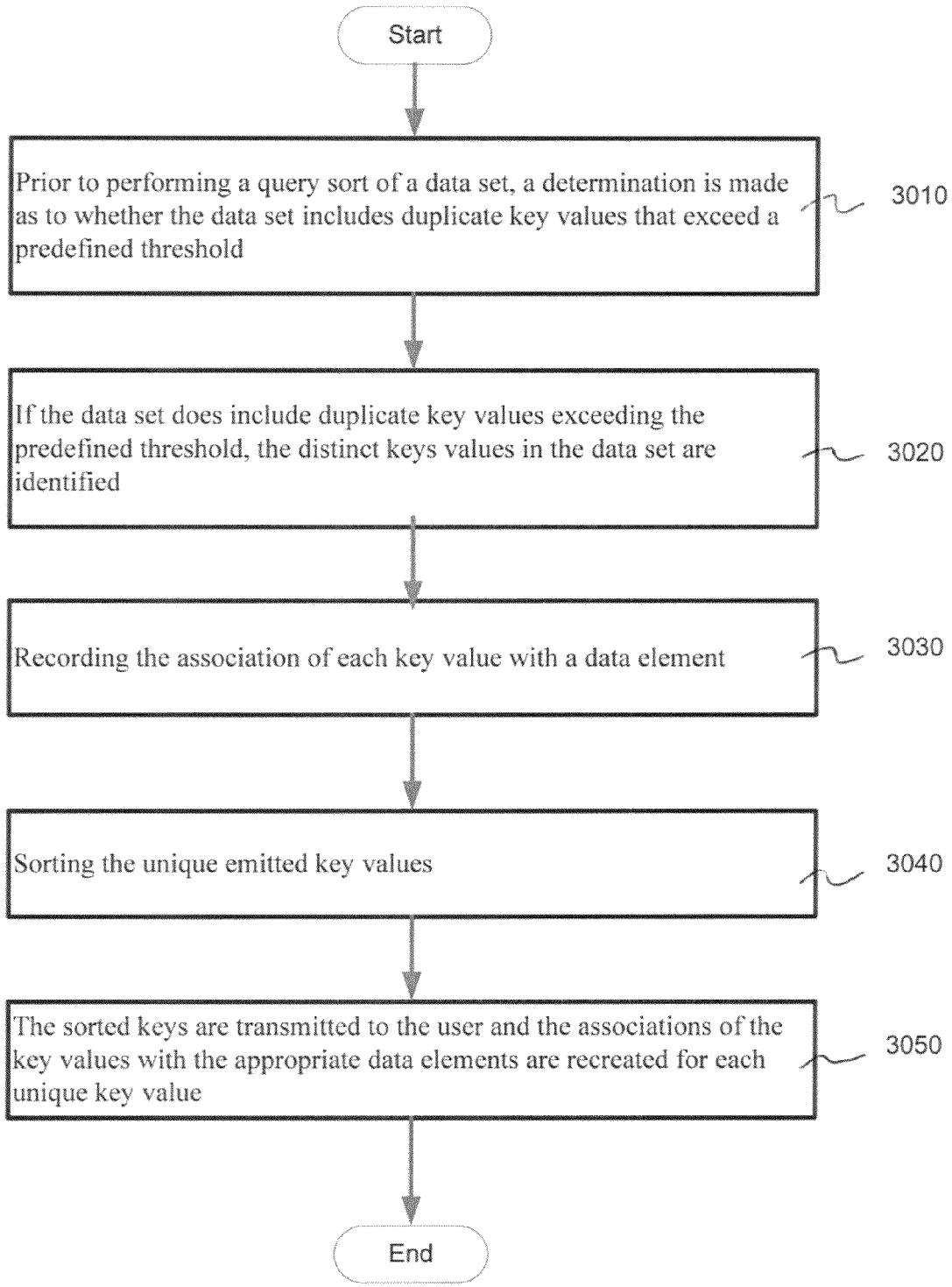
FIG. 3 illustrates the steps implemented in an embodiment of the present invention.

FIG. 3 illustrates the steps implemented in an embodiment of the present invention. In Step 3010, prior to performing a query sort of a data set, a determination is made as to whether the data set includes duplicate key values that exceed a predefined threshold. In Step 3020, if the data set does include duplicate key values exceeding the predefined threshold, the distinct keys values in the data set are identified. In Step 3030, the association of each key value with a data element is recorded. Specifically, data elements with the same key values may be grouped together and each unique key value is emitted to a memory device. In Step 3040, the emitted key values are sorted. In Step 3050, the sorted keys are transmitted to the user and the associations of the key values with the appropriate data elements are recreated for each unique key value.

Figure 4:
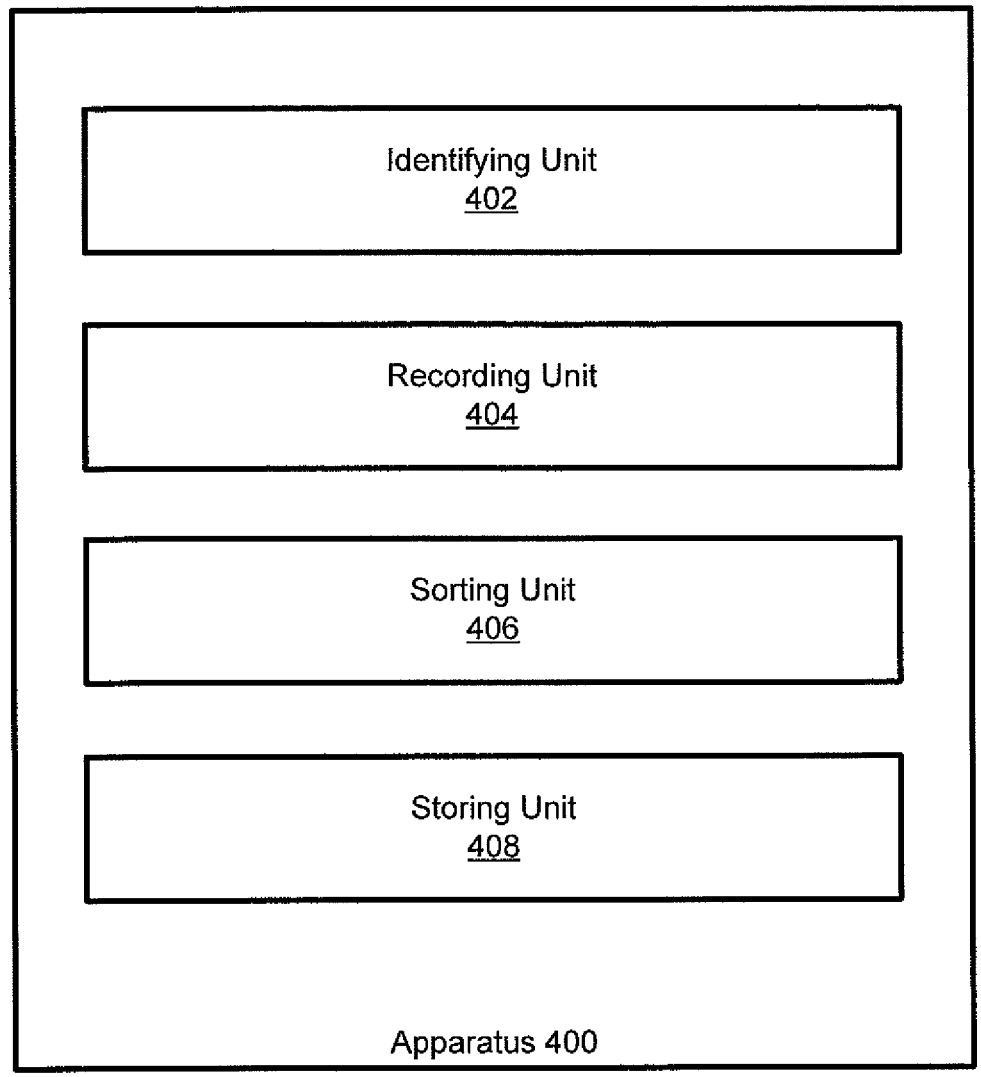
FIG. 4 illustrates an apparatus for implementing an embodiment of the invention.

FIG. 4 illustrates an apparatus for implementing an embodiment of the invention. The apparatus 400 includes an identifying unit 402 for identifying unique key values for a key in a data set, after determining that a number of duplicate key values for the key exceed a predefined threshold. The apparatus also includes a recording unit 404 for recording an association of each unique key value with a record in the data set and a sorting unit 406 for sorting unique key values. The apparatus further includes a storing unit 408 for storing the unique key values in a sorted order, wherein each unique key value is associated with an appropriate record in the data set. It should be noted that the elements of the apparatus may be implemented in one or more components illustrated in FIG. 1.

The DBMS is typically implemented as a back-end server in a computer network. As is known to one skilled in the art, the DBMS may be implemented on a back-end server which includes at least one memory component for storing information and at least one processing unit for processing information. The server may also be coupled to peripheral devices, such as a key board and a monitor. The components of the back-end server are already known to those skilled in the art so a detailed explanation of the components of the backend server is not provided.

As previously noted, that the DBMS is implemented in a computer network with components that are also known to those of ordinary skill in the art. Although the present invention has been shown and described with respect to certain embodiments, it should be understood by those skilled in the art that various modifications can be made to the inventive apparatus and the method of the instant invention without departing from the scope and spirit of the invention. It is intended that the present invention cover modifications and variations of the inventive DBMS sorting device and method provided they come within the scope of the appended claims and their equivalents.

What is claimed:

1. A method comprising:
   receiving an unsorted data set having unsorted key values, the unsorted data set including duplicate key values;
   determining whether the unsorted data set includes a number of duplicate key values that exceeds a predefined threshold value;
   in response to determining that the data set does include a number of duplicate key values that exceeds the predefined threshold value, identifying unique key values in the data set and adding each identified unique key value in the data set to a sorting data structure that sorts the identified unique key value as the identified unique key value is identified such that the identification of the unique key value and the sorting of the unique key value are performed concurrently;
   determining whether all unique key values of the unsorted data set have been added to the sorting data structure;
   in response to determining that all unique key values of the unsorted data set have been added to the sorting data structure, emitting each identified unique key value in the sorting data structure to a database in sorted order such that the identified unique key value is emitted a same number of times that the identified unique key value appears in the unsorted data set;
   re-associating each of the identified unique key values in the sorting data structure with a record in a memory;
   blending the identified unique key values from the sorting data structure with other data elements from the unsorted data set; and
   providing a sorted data set comprising the blended data elements to a query processor in response to a query sort operation.

* * * * *